Nov. 6, 1945.  H. M. McCOY  2,388,276
MECHANISM AND CONTROL FOR CONTROLLABLE AIRCRAFT PROPELLERS
Filed Sept. 16, 1942  7 Sheets-Sheet 1

INVENTOR
HOWARD M. McCOY
BY Edgar H. Snodgrass
Clyde Koontz
ATTORNEYS

Nov. 6, 1945.                H. M. McCOY                2,388,276
        MECHANISM AND CONTROL FOR CONTROLLABLE AIRCRAFT PROPELLERS
                    Filed Sept. 16, 1942        7 Sheets-Sheet 2

INVENTOR
HOWARD M. McCOY

Nov. 6, 1945. H. M. McCOY 2,388,276
MECHANISM AND CONTROL FOR CONTROLLABLE AIRCRAFT PROPELLERS
Filed Sept. 16, 1942 7 Sheets-Sheet 4

Nov. 6, 1945. H. M. McCOY 2,388,276
MECHANISM AND CONTROL FOR CONTROLLABLE AIRCRAFT PROPELLERS
Filed Sept. 16, 1942 7 Sheets-Sheet 6

INVENTOR
HOWARD M. McCOY
BY
ATTORNEYS

Nov. 6, 1945.   H. M. McCOY   2,388,276
MECHANISM AND CONTROL FOR CONTROLLABLE AIRCRAFT PROPELLERS
Filed Sept. 16, 1942   7 Sheets-Sheet 7

INVENTOR
HOWARD M. McCOY
BY
ATTORNEYS

Patented Nov. 6, 1945

2,388,276

UNITED STATES PATENT OFFICE 2,388,276

MECHANISM AND CONTROL FOR CONTROLLABLE AIRCRAFT PROPELLERS

Howard M. McCoy, Fairfield, Ohio

Application September 16, 1942, Serial No. 458,587

17 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to variable pitch propellers for aircraft and particularly to mechanism for automatically controlling the pitch of the propeller blades.

The advantages of the variable pitch propeller are well known, especially where the arrangement is such that great changes from take-off pitch angle to a full feathering pitch angle may be made in a matter of several seconds, and the range is such that the propeller blades may be rotated oppositely with equal speed through the pitch angle for zero torque into the braking pitch range.

An object of the invention is to provide a mechanism of this kind wherein the energy for the pitch change is derived from the source of propeller rotation.

Another object is to so construct the mechanism that the basic design will be adaptable to any standard engine shaft and nose without requiring that engine changes be made to accommodate this type of propeller.

Another object is to provide control means for effecting pitch change which is extremely sensitive to slight changes in propeller R. P. M.

Another object is to provide a simple and inexpensive means for indicating the angular position of the blades.

Another object is to provide a control mechanism which is operative automatically to adjust the propeller pitch as required to maintain a desired propeller and engine speed but with the addition of manual means to quickly adjust to full feathering in an emergency or to reverse position for braking.

Other objects will appear upon consideration of the following description, reference being made to the drawings, wherein, Fig. 1 is a schematic view of a device for changing the pitch of the blades of a propeller, wherein the energy for effecting the change is derived from the source of propeller rotation.

Fig. 2 is a schematic view of the pumps, pump circuits and control valves provided for operating the mechanism shown in Fig. 1.

Figs. 4 and 5 show alternate forms of braking means which may be substituted for those shown in Figs. 1, 2, 3 and 3a.

Similar numerals refer to similar parts through the several views.

Figures 1, 2, 4, 5:
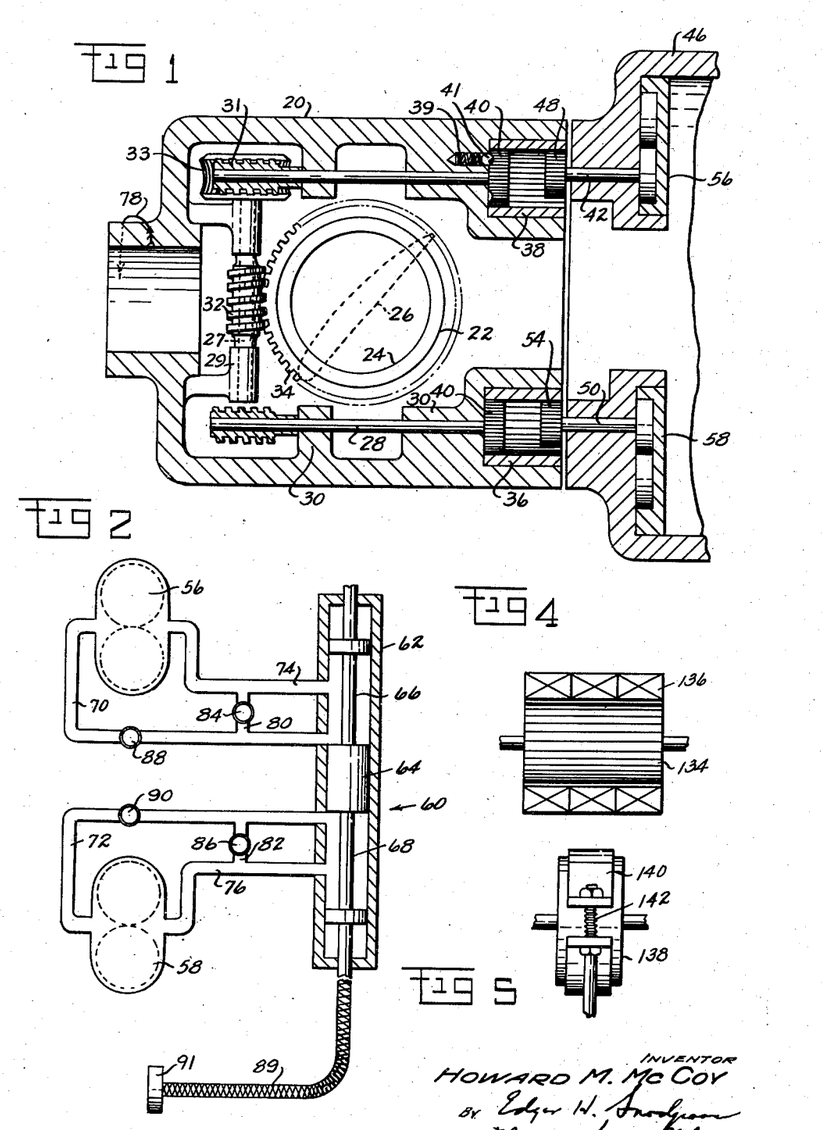

One form of the invention herein disclosed which pertains particularly to the changing of the pitch of the propeller blades is shown schematically in Fig. 1, where a propeller hub 20 has laterally extending bearing bosses 22 in which the shanks 24 of the propeller blades 26 (one only shown) are rotatable within their pitch change range about the blade axes.

Small axially parallel shafts 28 are rotatable in bearing bosses 30 of the hub 20 and thus revolve about the axis of the hub 20 as the hub rotates. A second pair of small shafts 27 extend transversely of the shafts 28 and are rotatable in bearing bosses 29 of the hub 20. Worms 31 are secured to the forward ends of the shafts 28 and mesh with worm wheels 33 on the ends of the shafts 27. Worms 32 are secured to the middle portion of the shafts 27 and mesh with worm wheels 34 on the inner ends of the blade shanks.

The rear face of the hub 20 is annularly grooved to provide rotative bearing support for the internally toothed ring gear 36 and the externally toothed ring gear 38, the two ring gears being dimensioned and positioned so that pinions 40 on the rear end of the shaft 28 will mesh with them both, whereby the two ring gears may rotate freely with respect to the hub although oppositely with respect to each other.

Because of the tendency of worm-and-wheel gearing to resist being driven from wheel to worm, the torque resulting from the natural tendency of the blade 26 to return toward flat pitch when in operation, will not turn the pinion 40 or ring gears 36—38 at any great rotative speed.

Due, however, to the fact that the torque above mentioned is applied to blades which are in a high state of vibration, there is a tendency for the blades to yield to this torque and creep toward flat pitch, so that some form of restraining means is preferably provided. In Fig. 1 this consists of a spring and ball detent 39—41 in an opening 43 in the hub 20, the ball being spring pressed into one after the other of a circular row of pockets 45 in the side of the pinion 40 as the pinion rotates relative to the hub.

Obviously the detent mechanism adds very little to the torque which must be applied to the pinion 40 to enable it to change the pitch angle through the worm gearing when driving from worm to wheel, yet it adds greatly to the torque which necessarily exists at the blade root to enable the blade root to drive the pinion through the worm gearing from wheel to worm. Ring gears 36—38 will therefore continue to rotate in perfect unison with the hub 20 as long as they are not retarded and brought to a lower speed than that which the hub is rotating by having some appropriate braking means applied to them.

However, when either ring gear 36 or 38 is held against rotation or has its rotation retarded while the hub 20 rotates, the pinion 40 rotates on its axis in the same direction as the hub, if the external ring gear 38 is held, and opposite in direction to the hub, if the internal ring gear 36 is held, thus turning the worm 32 and wheel 34 in one or the other direction to change the pitch of the blades. Means is therefore provided for retarding, or, when required, for holding one or the other of the ring gears, one at a time. The means provided for this purpose is as follows:

A shaft 42 is rotatable in a non-rotative housing 46, the shaft being so positioned that a pinion 48, secured to its forward end, meshes with the internal ring gear 36. A second shaft 50, similarly rotatable in housing 46, is so positioned that a pinion 54 on its forward end meshes with the external ring gear 38. Gear pumps 56 and 58 are drivably connected to the shafts 42 and 50 respectively. Obviously, any restraining force which retards rotation of the pump 56 or 58 will retard rotation of the ring gears 36 or 38 to respectively decrease or increase the pitch of the blades 26.

The two pumps 56 and 58, the hydraulic circuits through which they pump, and the valves which control the circuits are shown schematically in Fig. 2. The main control valve 60 comprises a valve casing 62, bored to slidably and preferably also rotatably receive the valve plunger 64, which is necked in to smaller diameters at 66 and 68, the pump discharge ports being connected by conduits 70 and 72, and the pump suction ports by conduits 74 and 76, to the valve casing within the length of the necked in portions, whereby, when the plunger is positioned centrally in the casing, as shown, fluid circulates freely from the pump 56 through conduit 70, around neck 66 and back to the pump through conduit 74, and at the same time circulates freely from the pump 58 through conduit 72, around neck 68 and back to the pump through conduit 76.

As long as fluid may be circulated freely by the pumps 56—58, through their external circuits 70—66—74 and 72—68—76, no change in propeller pitch will take place. When, however, the valve plunger 64 moves longitudinally in the casing 62, one or the other of the pump discharge circuits will be restricted or closed, depending on the amount of movement, and propeller pitch adjustment will take place. If, for instance, the plunger 64 is moved up to close the conduit 70, the pump 56 will practically cease rotation, whereby the shaft 42, pinion 48 and internal gear 36 must also practically cease rotation, whereupon pinion 40 rolls around the inner surface of internal gear 36, thus turning the shaft 28 in its bearing opposite to the rotation of the hub 20 (hub rotation indicated by the arrow 78) and thus operating the left hand worm-and-wheel gearing 31—33 and the right hand worm-and-wheel gearing 32—34 to decrease the propeller pitch. Obviously, shifting the plunger 64 in the opposite direction will increase the propeller pitch. A flexible cable control 89 may be extended to a position within convenient reach of the pilot and provided with a knob 91 for manual operation.

In order to avoid severe shock upon a too sudden closing of the external circuit of one or the other of the pumps, bypass conduits 80 and 82 are provided with relief valves 84 and 86 which may preferably be spring loaded and adjusted to yield at a pressure somewhat in excess of that required to hold one of the ring gears against rotation when turning the worm-and-wheel gearing for pitch increase or decrease.

The sensitivity control valves 88 and 90 are an important feature of the invention, for although they may be merely of a conventional needle valve type, and preferably thermostatically controlled type, it is their combination with the structure described which produces a unique result. Valves 88 and 90 may be placed at any point in circuits 70—66—74 and 72—68—76 respectively, both being individually adjustable manually.

It is common knowledge that the blade of a rotating propeller tends to rotate upon its axis to minimum pitch. Due, however, in the structure shown, to the high ratio of the worm-and-wheel gearing, and anti-creep provisions, the pitch decreasing torque cannot move the blade against the friction of the worm gears, and the blades are therefore always locked against blade angle change from their own torque, and are therefore dependent for change of angle upon energy transmitted from worm to wheel.

Since there is always some static friction which must be broken before pitch change can take place, and this may be less in initiating pitch decrease than pitch increase, the sensitivity control valves are preferably adjusted to restrict that circuit more which requires more braking energy to initiate pitch change. In this way the pitch change mechanism responds more uniformly to small changes in the plunger valve. The restriction placed by the sensitivity control valves in either circuit may preferably correspond to that amount which represents the difference in that circuit between the static and the sliding friction of propeller pitch change.

In lieu of the hydraulic braking system shown and described relative to Fig. 2, a friction braking system employing the centrifugal force of a revolving mass of mercury for applying the friction elements, may be used. Two of these brakes are required.

Figure 3:
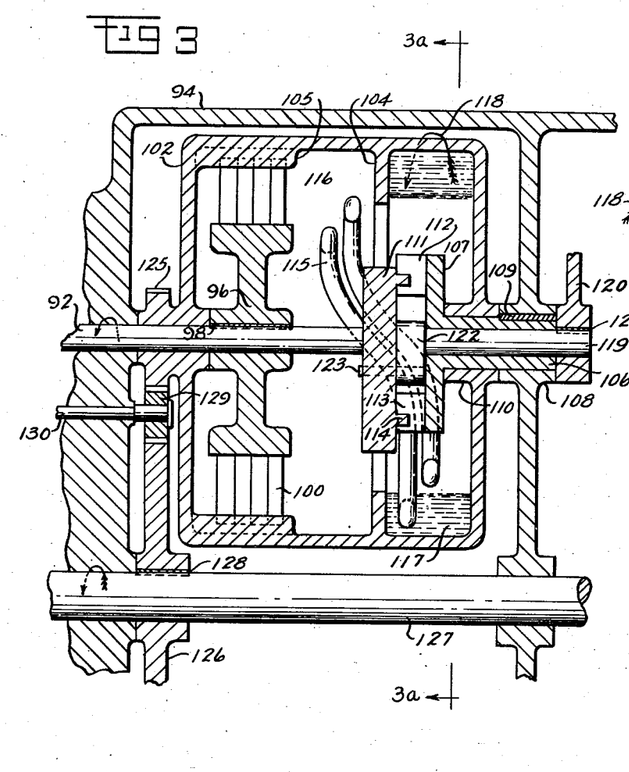
Fig. 3 is an axial section taken at 3—3 of Fig. 3a through a friction brake which may be substituted for the hydraulic brake of Figs. 1 and 2.
Figure 3A:
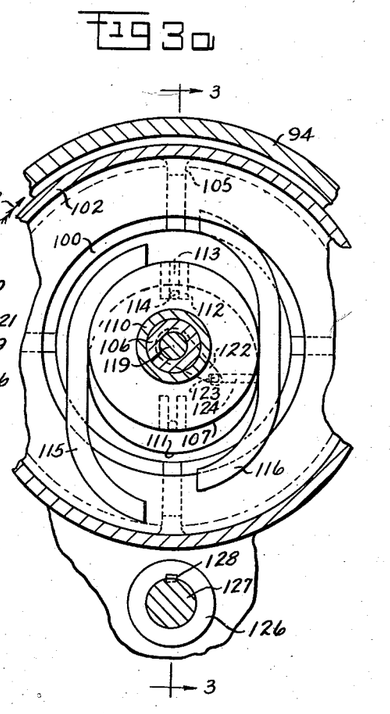
Fig. 3a is a transverse section taken at 3a—3a of Fig. 3.

In Fig. 3 and Fig. 3a, which show one of the mercury brakes, the shaft 92 is the member which is to be braked to effect pitch change and corresponds to the shaft 42 or 50 of Fig. 1. The shaft has rotative bearing in the stationary housing 94 which corresponds to the stationary housing 46 of Fig. 1.

A brake drum 96 is held on the shaft 92 by a key 98. A plurality of quadrantal brake shoes 100 surround the drum 96, the inner edges of the shoes being contoured to make frictional contact with the drum when the shoes are forced radially inward.

A casing 102 is freely rotatable on shaft 92, the inner peripheral surface being provided with an annular rib 104 and four axially extending ribs 105 which extend radially inward between the ends of circumferentially adjacent shoes to compel unitary rotation between the shoes and the casing, yet permit radial movement of the shoes.

A sleeve 106 having a flange 107 at its end is non-rotatably held in a hub 108 of the casing 102 by a key 109, the sleeve extending into the casing through a hub 110 whereby the casing has free rotative bearing on the sleeve. Non-rotatably supported within the casing 102 by the non-rotatable flange 107 is a disc 111. Flange 107 carries pairs of spaced apart ribs 112 which define radially extending grooves 113 in which pins 114 carried by the disc 111 are slidable, whereby the disc 111 is held against rotation but is transversely movable in the casing 102.

Secured to the periphery of the transversely movable disc 111 at diametrically opposite points are a pair of tubular scoops 115 and 116. These scoops are so formed and positioned that, when they have been moved transversely into the position shown in Figs. 3 and 3a, the scoop 115 will transfer mercury 117 from the right side of the annular partitioning rib 104 to the left side to apply the brake, the manner in which the outward centrifugal force of the mercury forces the brake shoes 100 inwardly into contact with the drum 96 being well known. However, when the scoops are moved transversely to the position opposite to that shown in Figs. 3 and 3a, they will return the mercury to the position shown to disengage the brake, rotation of the casing 102 being in both cases in the direction of the arrow 118.

The means for moving the disc 111 transversely consists of a shaft 119 having a lever 120 fastened to its outer end by a key 121, the inner end being provided with an arm 122 having a pin 123 extending laterally from its swingable end. A radial slot 124 in the disc 111 receives the pin 123, whereby oscillatory movement of the lever 120 moves the disc 111 transversely of the axis of shaft 92.

Rotation of the casing 102 is accomplished by means of a gear 125 on the casing, a gear 126 drivably secured to the propeller shaft 127 by a key 128, and an idler pinion 129 freely rotatable on a stud 130 in the housing 94. The idler pinion 129 is not required where the direction of rotation of the shaft 92 which is to be braked, is the same as the direction of rotation of the propeller shaft 127. Such a condition exists in Fig. 1 between the shaft 42 and the propeller hub 20 and braking of the shaft 42 would therefore preferably be accomplished with the mechanism of Fig. 3 minus the idler pinion 129, while the idler pinion would be included in the mechanism of Fig. 3 when employed for braking the shaft 50, Fig. 1, or the shafts 172 and 174 of Fig. 6 hereinafter described. Observance of this rule relative to the direction of rotation of the pinion shafts with respect to propeller rotation will insure that the drum 96 will always be rotating oppositely of the shoes 100, whereby the relative speed of friction between the braking elements will be greater than when braking the rotating drum with non-rotative shoes.

While a manual means only is shown for operating the braking means in Fig. 3, obviously the braking and consequent propeller pitch regulation may be accomplished automatically, as by applying an electromagnet to the lever 120 and controlling the electromagnet with an electric flyball governor as hereinafter described relative to Fig. 8.

In any event, the two pinion shafts which are to be braked must be braked only one at a time, and its is therefore advisable to so interconnect the levers 120 of the two braking mechanisms that this result will be achieved.

An eddy current brake, as shown in Fig. 4, consists of a rotor 134 and coils 136, eddy current braking being had when a circuit through the coils is closed.

A manually operable mechanical brake Fig. 5 consists of a drum 138, band 140 and a screw 142 to draw up the band about the drum. The electrical and the mechanical brakes are conventional and do not, as such, form a part of this invention.

In the structure shown in Fig. 1, one of the two ring gears 36—38 is held against rotation to effect pitch increase and the other to effect pitch decrease, and, since one ring gear is necessarily larger than the other, it follows that pitch decrease must be effected at a faster rate than pitch increase or vice versa. A modified form of reaction gearing is shown in Fig. 6 in which the ratios for effecting pitch increase and pitch decrease are the same.

Figure 6:
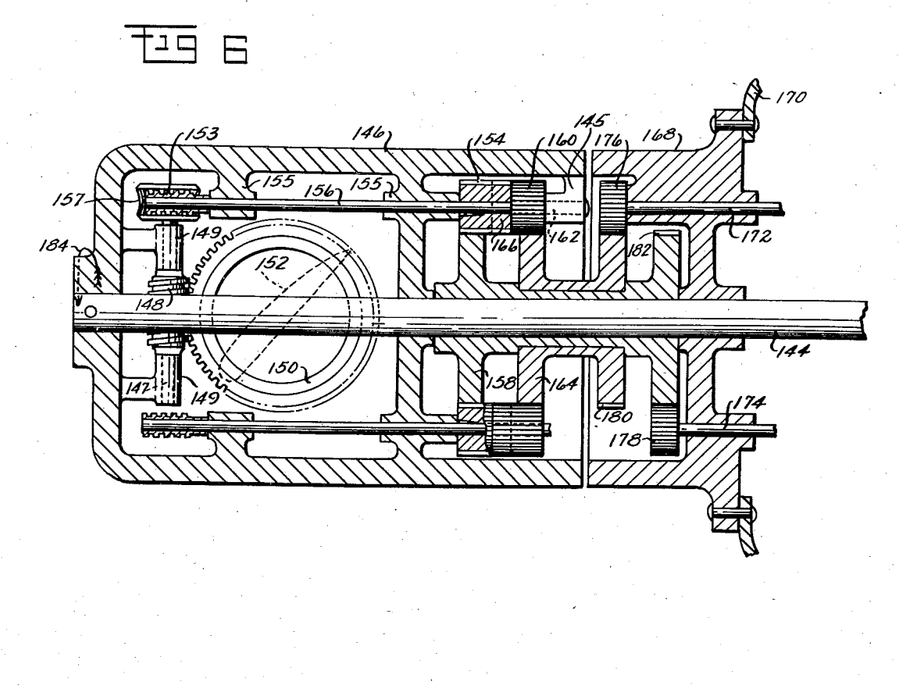
Fig. 6 shows an alternate form of gearing which may be substituted for that shown in Fig. 1.

Referring to Fig. 6, a propeller shaft 144 drives a propeller hub 146 which houses and provides bearings for the two-stage worm gearing. A worm 148, rotatable on shaft 147 between bearing hubs 149, meshes with worm wheel 150 which is attached to the shank of the blade 152. A shaft 156, rotatable in bearings 155, at the rear end carries an elongated pinion 154 and at the front end a worm 153. A worm wheel 157 is fast on the end of the shaft 147 and meshes with the worm 153.

The pinion 154 meshes with a gear 158 which is freely rotatable on the shaft 144. A second pinion 160 rotates freely on a stud 162 supported in a boss 145 in the hub 146, the second pinion being meshed with a gear 164. The faces of the two pinions 154 and 160 overlap and mesh with each other at 166, whereby, if either of the gears 158 or 164 rotates relative to the hub 146, the other gear will rotate oppositely. Likewise, if gear 158 is held against rotation while the hub 146 is rotating, the worm 153 will be rotated on its own axis in the same direction as the hub, but if gear 164 is held against rotation while the hub 146 is rotating, the worm 153 will be rotated on its own axis in a direction opposite to that of the hub. Whether the pitch of the blade 152 is increased or decreased depends therefore on which of the two gears 158 or 164 is held or retarded.

The means for retarding the gears 158 and 164 includes a casing 168 secured, against rotation, to a non-rotating part 170 of the engine. Rotatably supported in the casing 168 are shafts 172 and 174 carrying pinions 176 and 178 respectively. Pinion 176 meshes with a gear 180 which is joined for unitary rotation with the gear 164 whereas pinion 178 meshes with a gear 182 which is joined for unitary rotation with the gear 158, whereby arresting or retarding the shafts 172 or 174, one at a time, will arrest or retard the gears 164 or 158 and thereby respectively decrease or increase the pitch of the blade 152, assuming the worm 148 to be right hand, the worm 153 left hand, and rotation of the hub 146 in the direction of the arrow 184.

As a braking means for arresting or retarding the shafts 172 or 174, any of the devices shown in Figs. 2 to 5 inclusive, or any braking means of this character, may be employed and controlled either manually or automatically as desired.

Figures 7, 15:
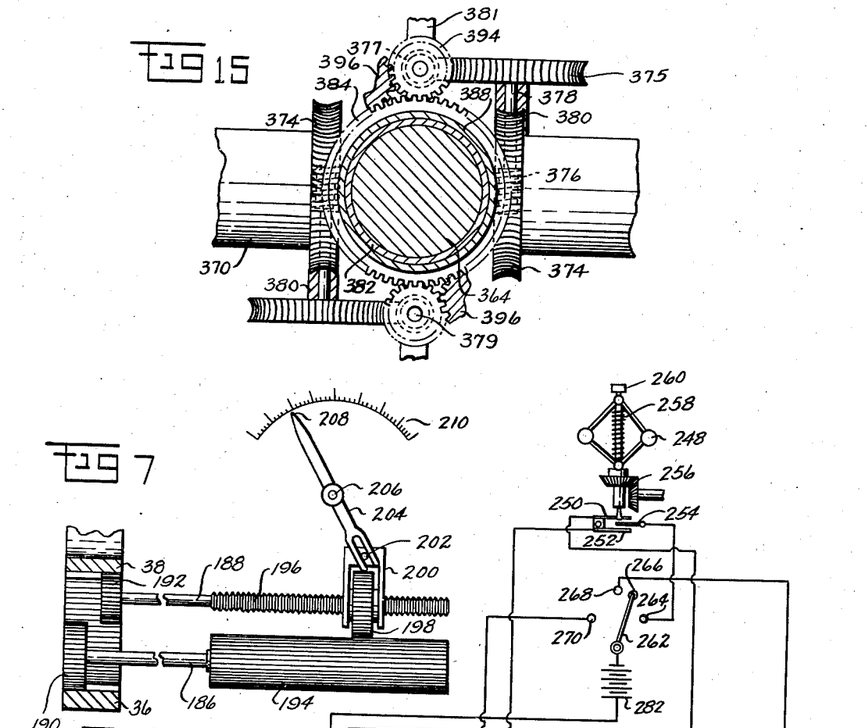
Fig. 7 is a schematic view of the means employed to indicate the angular position of the propeller blades.
Fig. 15 is a transverse section taken at 15—15 of Fig. 13 through one of the gear trains.

In order that the pilot may, at any time, know the pitch to which his propeller is at that time adjusted, the pitch indicating mechanism schematically shown in Fig. 7 is provided. In this mechanism the internal and external ring gears 36 and 38 of Fig. 1 are used for driving the indicator shafts 186 and 188. Pinions 190 and 192 are meshed with the ring gears and respectively drive the shafts 186 and 188. The pinions 190 and 192 are so proportioned that the ratio of gear 36 to gear 190 is the same as the ratio of gear 38 to gear 192, whereby, when the ring gears 36 and 38 rotate in unison, the shafts 186 and 188 will also rotate in unison.

A wide faced pinion 194 and a screw thread 196 are drivably secured to the ends of the shafts 186 and 188 respectively. A narrow faced pinion 198 is internally threaded to fit the screw thread 196. The wide and the narrow pinions 194 and 198 have the same number of teeth and therefore rotate in unison as long as the shafts 186 and 188 rotate in unison.

When pinion 194 and screw 196 rotate at the same speed and pinion 194 and pinion 198 rotate at the same speed, the pinion 198 will be rotating at the same speed as the screw 196 upon which it is fitted. Obviously, under this condition the pinion will not be moved axially in either direction on the screw. It is only when the pinion 198 makes more or less turns in a unit of time than the screw that it advances or recedes on the screw. It follows that as long as the ring gears 36—38 rotate as one, the pinion 198 will maintain the same position on the screw 196, but when either ring gear is held against rotation or retarded, the pinion 198 will move in one or the other direction along the axis of the screw.

A yoke 200 straddles the pinion 198 and is moved along the axis of the screw by the pinion as the pinion moves axially one or the other direction, means (not shown) being provided to prevent the yoke swinging about the axis of the screw. A pin 202 engages the slotted end of an indicator needle 204, which is pivoted at 206, to move the pointer 208 along the graduations 210. The yoke 200 may appropriately be referred to as the pitch indicator carriage. Since both propeller blade adjustment and indicator needle movement are governed by retardation of one or the other of the ring gears, the graduations 210 may readily be made to show the degree to which the blade has been adjusted at any moment. The shafts 186 and 188 may be extended to bring the pointer 208 within convenient view of the pilot, the extension being preferably by flexible shaft so that the indicia may be located in any desired position, or the pinions 194, 198, screw 196, yoke 200 may be located close up to the ring gears, and oscillatory movement of the yoke be imparted to a remote pointer mechanically, electrically, hydraulically, or by any other desired means (not shown).

In the foregoing description of an embodiment of the pitch indicating means, it is stated that the ratio of ring gear 36 to pinion 190 should be the same as the ratio of ring gear 38 to pinion 192. This is, of course, true only where a one-to-one ratio is provided between the pinions 194 and 198. If proper compensation is made in the ratio of pinions 194—198, any ratio within reason may exist between the ring gears and their pinions. For instance, if the ratio of gear 36 to pinion 190 is eight-to-1 and the ratio of gear 38 to pinion 192 is four-to-1, then the wide faced pinion 194 should be only half the diameter of the narrow faced pinion 198.

Thus far in the foregoing description, particularly as it relates to Figs. 1 and 6, no means has been proposed for operating the control valve 60 automotically. Since the object of the automatic regulation is to maintain a constant propeller and engine R. P. M., the regulating means resolves itself primarily into a device for increasing the propeller pitch when the engine rotates faster than a selected normal and decreasing it when rotation is slower. Fig. 8 shows, schematically, a device which includes a reversible electric motor with suitable reduction gearing connecting it to the valve for shifting the valve in one or the other direction for increasing or decreasing propeller pitch, with a centrifugally operative electric switch for controlling rotation of the motor, operating it in one or the other direction as the speed of the centrifugal device rises or falls. The arrangement also includes an electric switch for manual operation of the motor, in one or the other direction, and an electric clutch for disconnecting the motor and valve when no current is passing through the motor. Additional electric switches, automatically operable by movement of the pitch indicator, are provided for limiting the extent of pitch adjustment both when adjustment is being effected by the centrifugal switch and when it is being effected by the manual switch.

Figure 8:
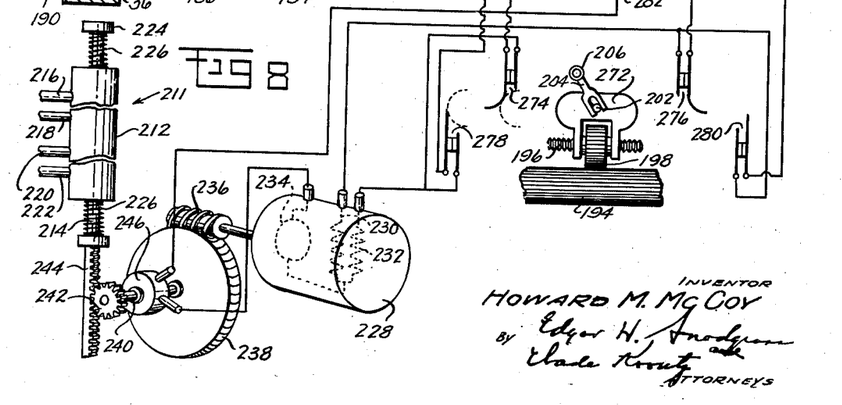
Fig. 8 shows an electrically actuated mechanism and its wiring diagram for operating the control valve of Fig. 1.

In the Fig. 8 the valve 211 has a casing 212 and a plunger 214 which are substantially like those shown in Fig. 1, the plunger being axially slidable up or down to control the pump circuits 216—218 or 220—222. Additionally, collars 224 confine springs 226 whereby the plunger 214, when not otherwise restrained, will assume the central or neutral position shown where fluid may circulate freely through both pump circuits at the same time.

The electric motor 228 is reversible by virtue of the inclusion of field windings 230 and 232 of opposite polarity, the coil 230 being employed for rotation in one direction and the coil 232 for rotation in the other direction, the direction of the current in the armature circuit 234 remaining the same in both cases. To facilitate description, the internal circuit through winding 230 may be called the internal circuit for pitch increase while that through winding 232 may be called the internal circuit for pitch decrease.

A worm 236 on the motor shaft engages a worm wheel 238 on a countershaft 240, a pinion 242 on the countershaft engaging a rack 244 which depends from the valve plunger 214, whereby rotation of the motor in one or the other direction moves the valve plunger up or down from its neutral position for the purpose described relative to Fig. 1.

A solenoid clutch 246 of conventional type is interposed between the pinion 242 and the worm wheel 238. The clutch may preferably comprise driving and driven friction elements held in disengaged position by a spring, but engageable by a solenoid when current is applied thereto. The solenoid circuit in this case is in series with the motor circuit, whereby, whenever the motor is stopped by discontinuation of the current, the pinion 242 is free to rotate without rotating the worm gear of the motor, whereby the springs 226 may easily and quickly return the valve plunger 214 to zero position whenever the motor stops.

For automatic regulation of the valve plunger 214, a flyball governor 248 is provided, the governor being operative, upon a change in speed from a selected normal, to move the two spaced apart insulated contact members 250 and 252 upward or downward into engagement with an intermediate stationary contact member 254. The governor is preferably driven by the engine through the gearing 256. The flyballs are held against the action of centrifugal force by a spring 258 which may be adjusted by the screw 260 or by some conventional remote control thereof to alter the selected normal. The arrangement of the flyballs is such that an increase in rotative speed lowers the contact 250 into engagement with 254 while a decrease in speed raises the contact 252 into engagement with 254. For convenience in description the contacts 250 and 252 may be termed the automatic pitch increase and the automatic pitch decrease contacts, while the contact 254 may be termed the automatic current supply contact.

A manually operable switch 262 is shiftable to a position 264 to provide a circuit for automatic operation of the valve 211: to an off position 266; to a position 268 for manually increasing the propeller pitch; and to a position 270 for manually decreasing the propeller pitch. In the "off" position 266, and in the automatic position 264, the switch 264 is preferably stable, i. e., it should remain closed in these positions when so placed. In the "increase pitch" position 268 and in the "decrease pitch" position 270, however, it should normally be "momentary," i. e. should be so constructed as to open unless held closed by the operator, or unless he actuated some form of lock to intentionally hold it closed. It should be noted that control is by means of the reversible motor whether it is manually or automatically operated. The contact 264 may be called the automatic supply contact, and the contacts 268 and 270 the manual pitch increase and the manual pitch decrease contacts respectively.

The pitch indicator of Fig. 7 is repeated in Fig. 8 with slight modification of the pitch indicator carriage as shown at 272, this part being additionally employed to operate a pair of electric switches 274 and 276 for limiting the degree of propeller adjustment which may be effected by automatic operation, and a second pair 278 and 280 for limiting the degree of adjustment which may be effected by manual operation. The switches 274, 276, 278 and 280 are placed in the line of travel of the carriage 272 so as to be opened thereby.

By wiring as in Fig. 8 and closing the manual switch 262 on the automatic position 264, alternate circuits are made by change in governor speed, one from a battery 282 through switch 262, contacts 254, 250, limit switch 276, field coil 230, armature 234, clutch 246 back to the battery, the other from battery 282, through switch 262, through switch contacts 254, 252, limit switch 274, field coil 232, armature 234, clutch 246 back to the battery. Current, therefore, when directed by the governor 248 through the one circuit, operates the motor 228 and valve 211 in one direction for pitch increase, and, when directed through the other circuit, operates the motor 228 and valve 211 in the other direction for pitch decrease. The object of increasing or decreasing the propeller pitch is, of course, to cause the engine to respectively decrease or increase its speed, and if at any time the engine is far enough underspeed to cause the governor 248 to close the contacts 252—254 for pitch decrease, and if for any reason the engine cannot sufficiently increase its speed upon continued decrease in propeller pitch, and operation of the electric motor 228 therefore continues in the direction which holds the valve stem 214 in the upper position until the pitch indicator carriage 272 opens the limit switch 274, thus breaking the electric circuit, whereupon pitch decrease stops at the predetermined minimum pitch angle for which the limit switch 274 has been set, which, for example, may for a given engine-propeller combination be about fifteen degrees above zero pitch, and automatic pitch change operation will not thereafter be resumed until the engine does regain sufficient speed to cause the governor 248 to close the contacts 250—254, thereby completing a circuit through the still closed limit switch 276 which operates the motor 228 to again increase the pitch.

On the other hand, if the engine is sufficiently overspeed to have closed the contacts 250—254 for pitch increase, and if for any reason the engine cannot sufficiently decrease its speed upon continued increase in propeller pitch, and operation of the electric motor 228 therefore continues in the other direction which holds the valve stem 214 in the lower position until the pitch indicator carriage 272 opens the limit switch 276 and breaks the electric circuit, whereupon pitch increase stops at the predetermined maximum pitch angle for which the limit switch 276 has been set, which, for example, may be about 55 degrees above zero pitch, and automatic pitch change operation will not thereafter be restored until the engine does lose sufficient speed to cause the governor 248 to close the contacts 252—254, thereby completing a circuit through the closed limit switch 274 which operates the electric motor to again decrease propeller pitch. It should be noted that under the foregoing conditions where the electric motor 228 continues rotation up to the time at which the circuit is broken by one or the other of the limit switches 274 or 276, the valve plunger 214 may reach the limit of its movement before the motor discontinues rotation, and in such case the clutch 246 may slip until the circuit, which energizes both the motor and the clutch, is broken.

The automatic pitch change mechanism above described is concerned only with such changes in propeller pitch as may be required to maintain a constant engine speed, the more extensive changes in pitch, i. e. the feathering and the braking positions being effected by means of the manual switch 262.

Where feathering becomes advisable, as where one of a group of engines of a large craft becomes inoperative, the manual switch 262 is closed on to the contact point 268 for increase pitch and left closed until the pitch change carriage 272 opens the switch 280, which may be when the pitch angle approaches 90 degrees above zero.

For propeller braking, the manual switch is closed on to the contact point 270 for decrease pitch and usually left closed until the pitch change carriage 272 opens the switch 278, which, for a given aircraft-engine-propeller combination, may preferably be when the pitch angle is about minus twenty-five degrees.

The combination automatic and manual control system has the further advantage that at any time the operator may shift out of automatic control by moving the switch 262 from the automatic position 264 to the off position 266, and the pitch will be fixed at the angle shown by the pitch indicator at the time of the shift. The operator may henceforth control the pitch setting manually by momentarily holding the switch 262 closed on one or the other of the points 268 or 270, as the case may require, the pitch indicator showing him the degree of pitch change being effected and the switches 278 and 280 being operative to stop pitch change if the switch is held closed for too long a period. The mechanical stops of common practice used for limiting pitch change may supplement the limit switches as an added safety feature inasmuch as no damage can result from turning the blades to a positive stop since the relief valves 84—86 will yield when a preselected pressure is exerted while turning the propeller blades in pitch.

In the arrangement shown in Fig. 8, by a proper selection of governor point contact gap, and of the reduction gear ratio of the motor 228 depending on its acceleration, torque and R. P. M. characteristics, it is evident that small changes from "off-speed"- back to "equilibrium" will be made without "hunting" since a contact lasting but a fraction of a second will cause the motor to make but a few turns and hence move the valve only a slight distance and cause but a slight change in propeller pitch. Large changes may involve some "overshooting" of the "equilibrium" condition but this action will be damped rapidly, governor characteristics determining the rapidity of the damping. A conventional or any other "proportional" type of electric governor will materially assist in preventing hunting, particularly a type which proportionalizes on length of time of contact closing, for the latter type would permit the valve to return to center position between each "proportionalizing" impulse.

The arrangement shown in Fig. 8 and the description relating thereto contemplates that the negative range of pitch change for braking should be manually controlled. It is, however, quite desirable that propellers arranged for negative pitch be provided with constant speed control throughout the negative range.

Figures 8A, 8B:
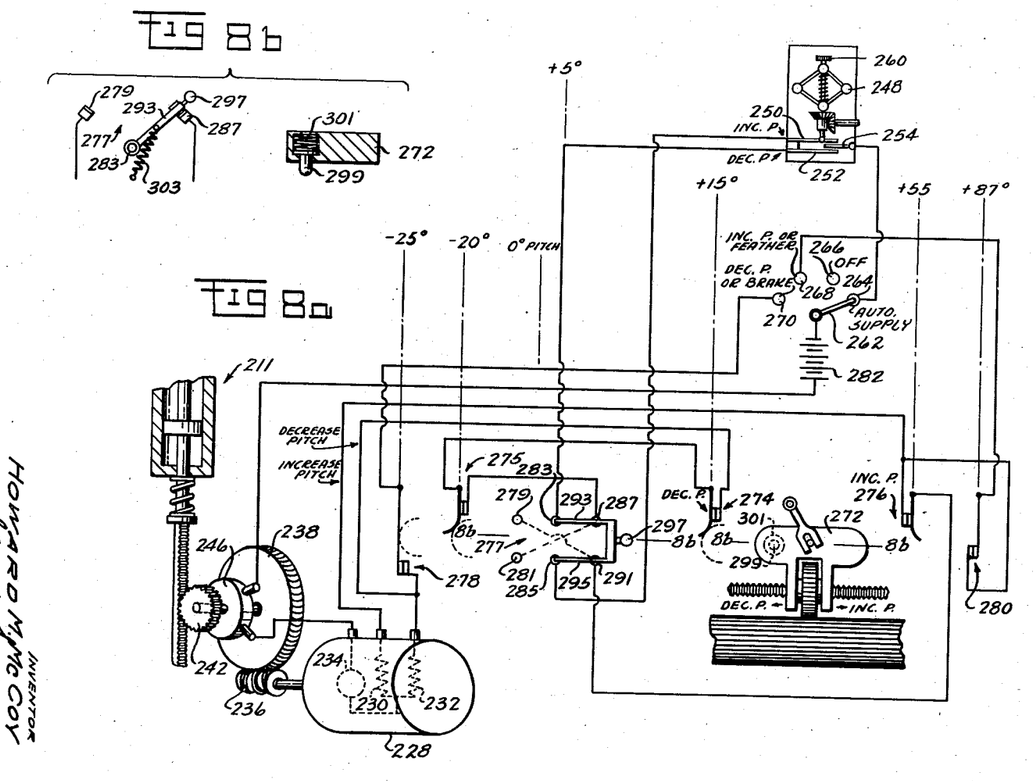
Figs. 8a and 8b show a further development of the mechanism shown in Fig. 8.

By slight changes and additions to the structure shown in Fig. 8, the same centrifugally operated electric switch which is provided for automatic control of the normal flying range of pitch change, may be made to function as a constant speed control for the negative or braking range. The changes and additions are shown in Fig. 8a and Fig. 8b, where the valve 211, the electric motor 228 with field coils 230 and 232 and armature 234, the gearing 236, 238, 242, the clutch 246, the governor 248, the governor controlled contacts 250, 252 and the stationary contact 254, the manual switch 262 and its contacts 264, 266, 268 and 270, the battery 282, the pitch indicator mechanism including the carriage 272, and the limit switches 274, 276, 278, and 280 are all like those shown in Fig. 8, while an additional limit switch 275, and a double-pole, double-throw, tumbler-type switch 277, having contacts 279, 281, 283, 285, 287, and 291 and switch blades 293 and 295, is provided for alternately connecting parts of the contacts.

A knob 297 throws both blades 293 and 295 simultaneously, the knob being placed in the path of a plunger 299 in the carriage 272, the plunger being movable vertically in the carriage and resiliently held to its lower position by a spring 301. An over-center spring 303 provides a quick-action means whereby, when the plunger 299 engages the knob 297 and moves it in a direction away from a pair of contacts until the blades 293, 295 are slightly past a vertical position, the over-center spring will snap the blades to the opposite pair of contacts, and as the plunger thereafter moves farther in the same direction so that it passes over the knob, the spring 301 will yield to allow the plunger to rise and pass over.

By electrically connecting the various parts of Figs. 8a and 8b, as shown, it may be operated as follows:

In the drawings, the tumbler switch 277 is set for normal flight, the governor 248 is "on speed" and the manual switch 262 is set to supply current to the governor for automatic operation of pitch change.

If the engine now overspeeds, contact will be made by the governor between blades 250 and 254, thereby making a circuit from the battery 282 through 262, 264, 254, 250, 285, 295, 291, 276, 230, 234 and back to the battery, whereby the propeller pitch will be increased and the engine brought back down to speed. If, however, for any reason, continued pitch increase fails to bring the engine down to speed, pitch increase will be stopped by the limit switch 276 at a preselected pitch angle which may, for example, be about +55 degrees.

Conversely, if the engine is running underspeed, contact will be made by the governor between blades 252 and 254, thereby making a circuit from the battery 282, through 262, 264, 254, 252, 283, 293, 287, 275, 274, 232, 234 and back to the battery, whereby the propeller pitch will be decreased and the engine brought back up to speed. If, however, for any reason, continued pitch decrease fails to bring the engine up to speed, pitch decrease will be stopped by the opening of the limit switch 274 at a preselected pitch angle, which may, for example, be about +15 degrees.

Full feathering is still accomplished manually, as explained relative to Fig. 8, by placing the manual switch 262 on contact 268, thereby completing a circuit from the battery 282 through 262, 268, 280, 230, 234 and back to the battery, whereby pitch increase continues until full feathering is effected, at which pitch angle—which may, for example, be about 87 degrees—the limit switch 280 is opened by the carriage 272.

For propeller braking, the manual switch 262 is put onto the contact 270, completing a circuit from the battery 282 through 262, 270, 278, 232, 234 and back to the battery for effecting pitch decrease. The switch 262 should now be momentarily held in this position. When pitch is decreased until the carriage reaches a preselected position, which is that blade angle at which the thrust is zero, which may be, for example, about +5 degrees—the tumbler switch 277 will be tripped from the contacts 287, 291 to the opposite contacts 279, 281. When pitch decrease has continued slightly further—say until the indicator shows 0° pitch—the manual switch 262 may be closed on to the contact 264 for automatic control of propeller braking.

Suppose the engine for any reason momentarily exceeds the "on-speed" setting with the propeller blades in the "auto" braking range, contact will then be made between the blades 250 and 254, and, since the blades 293 and 295 of the tumbler switch now are connecting the contacts 279 to 283 and 281 to 285, a circuit will be formed from the battery 282 through 262, 264, 254, 250, 285, 295, 281, 287, 275, 274, 232, and 234, and back to the battery.

Since the motor field coil 232 is in the circuit, the motor will rotate in a direction which will increase the negative pitch, that is, it will rotate in a direction which will move the carriage 272 to the left. However, movement of the carriage to the left of the angle for zero thrust indicates that the reverse thrust loading on the blades is increasing, whereby the engine will be brought back to "on speed."

Suppose the engine for any reason momentarily underspeeds, then the governor will cause contact between 252 and 254 to be made, thus closing a circuit from the battery 282 through 262, 264, 254, 283, 293, 279, 291, 276, 230 and 234, and back to the battery. The direction of rotation of the motor, therefore, is now such as to cause movement of the carriage 272 to the right, which will decrease the negative blade angle and allow the engine R. P. M. to rise back to its proper speed.

Should the carriage 272 for any reason move to the left past a preselected blade angle, say, 20 degrees, when automatic control of the negative range is in effect, the limit switch 275 will be opened to prevent a greater negative blade angle being reached, and should the carriage 272 for any reason move to the left past a preselected blade angle, say, —25 degrees, when manual control of the braking was being employed, the limit switch 278 will be opened to prevent a greater negative blade angle being reached.

It should be understood that the values of blade pitch at which the several instrumentalities function are arbitrarily selected, and the illustrations merely schematic.

In the modified form of control shown in Figs. 9 through 12, the main control valve is operated by a mechanical flyball governor, while a series of electrically operable valves supplement the governor action.

Figures 9, 10, 11, 12:
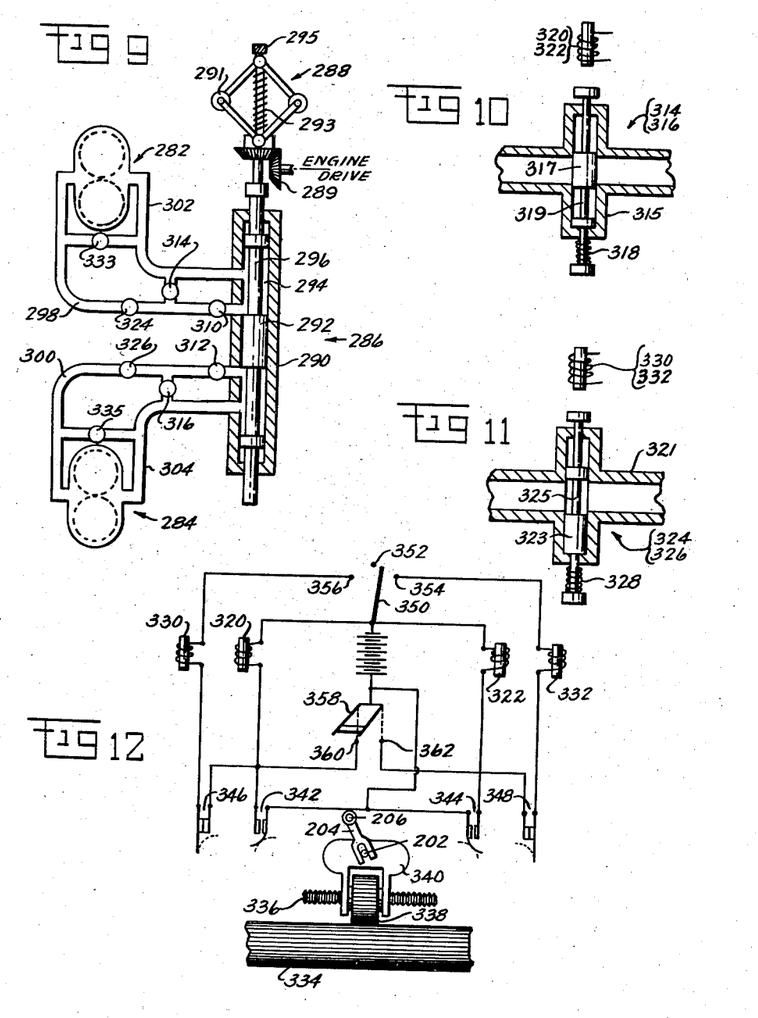
Fig. 9 shows another form of operating mechanism for the control valve wherein the control valve itself is centrifugally operated and a system of auxiliary valves are in part electrically operated.
Figs. 10 and 11 show some of the electrically operated valves in detail.
Fig. 12 is the wiring diagram for operation of the electrical parts of the mechanism shown in Figs. 9, 10 and 11.

Referring more especially to Fig. 9, the pumps 282 and 284, which act as braking means for the reaction gearing (gears 36 and 38 of Fig. 1), have their external circuits controlled by a valve 286 which is in turn controlled by a flyball governor 288 driven from the aircraft engine through gears 289. The governor 288 is so constructed that increase in speed which moves the governor weights 291 outwardly thereby moves the valve stem 292 downwardly against the resistance of the spring 293. A screw 295 is provided for adjusting the spring so that the governor will maintain any selected normal speed within its range. Conventional arrangements can be made to control the screw remotely. Valve 286 consists of a casing 290 bored to slidably, and preferably also rotatably, receive the valve plunger 292 which is necked in to a smaller diameter at 294 and 296, the pump discharge ports being connected by conduits 298 and 300 and the pump suction ports by conduits 302 and 304, to the valve casing within the length of the necked in portions, whereby, when the plunger is positioned centrally in the casing, as shown, fluid circulates freely from the pump 282 through the conduit 298, around neck 294 and back to the pump through conduit 302, and at the same time circulates freely from pump 284 through the conduit 300, around neck 296 and back to the pump through conduit 304.

Sensitivity control valves 310 and 312 are provided as and for the purpose described relative to Fig. 2. Electromagnetically operable valves 314 and 316, shown in detail in Fig. 10, each consisting of a body 315 and a plunger 317 which is necked in to a smaller diameter at 319, are interposed in bypass channels connecting the discharge and suction sides of the pumps, these valves being biased to the closed position by springs 318, but both operable to an open position by energization of electromagnets 320 and 322. Two additional electromagnetically operable valves 324 and 326, shown in detail in Fig. 11, each consisting of a body 321 and a plunger 323 which is necked in to a smaller diameter at 325; are interposed in each pump circuit as shown, these valves being biased to the open position by springs 328 but both operable to a closed position by energization of electromagnets 330 and 332. Relief valves 333 and 335 are placed as shown to relieve abnormal pressure which may occur when valve 286 or either of the valves 324 or 326 closes one of the circuits.

In the wiring diagram Fig. 12 the pitch indicator parts, consisting of a wide faced pinion 334, a screw 336, a narrow faced pinion 338 and a pitch indicator carriage 340, pin 202, needle 204 and pivot 206, are similar to those shown in Fig. 8. The limit switches 342, 344, 346 and 348 are also similar to those shown in Fig. 8, except that the two switches 342 and 344 which delimit the range of automatic pitch change are operable by the pitch change carriage to a closed instead of an open position.

A manual switch 350 has an "off" position 352, a "pitch increase" position 354 and a "pitch decrease" position 356. The switch 350 is preferably spring biased to return to the "off" position 352 unless the operator either holds or locks it in one of its other positions. A two-pole switch 358 is placed in the open position for automatic pitch change and in the closed position for manual pitch change, the closed position consisting of engagement with contacts 360 and 362. Conventional means is provided to keep the switch stable in either of the positions into which it may be placed.

For effecting automatic operation of the control device shown in Figs. 9 through 12, the switch 358 is set in the automatic or open position, the switch 350 being normally spring biased to the "off" position. No current may now flow through any of the circuits shown in the wiring diagram Fig. 12 and the system will depend wholly for pitch change operation on the centrifugal operation of the valve 286. Under this condition the electrically operable valves 324 and 326 are fully open and there will be no other impediment in either pump circuit, except the slight restraint offered by the sensitivity control valves 310 and 312, until the governor 288 moves the stem 292 of the main valve 286 up to close the discharge pipe 298 of the pump 282 or down to close the discharge pipe 300 of the pump 284, the manner in which such valve stem movement effects pitch change being fully described relative to Figs. 1 and 2.

If at any time, during the course of automatic operation, the engine is far enough underspeed to cause the governor 288 to raise the valve stem 292 and thus close the pump discharge pipe 298 for the purpose of decreasing the propeller pitch, and if for any reason the engine fails to respond and increase its speed upon continued decrease in propeller pitch, and pitch decrease therefore continues until the pitch indicator carriage 340 closes the limit switch 342 which energizes the core 320 and opens the electromagnetically controlled valve 314 which completes a hydraulic circuit for the pump 282 irrespective of the main valve 286, whereby pitch decrease stops at the predetermined minimum pitch angle for which the limit switch 342 has been set, which, for example, may preferably be about fifteen degrees above zero pitch, and automatic pitch change operation will not thereafter be resumed until the engine does regain sufficient speed to cause the governor 288 to move the valve stem 292 down to where it restricts the circuit of the lower pump 284 to thereby again increase the pitch.

Conversely, if the engine is sufficiently overspeed to cause the governor 288 to lower the valve stem 292 and thus close the pump discharge pipe 300 for the purpose of increasing the propeller pitch, and if for any reason the engine fails to respond and decrease its speed upon continued increase in propeller pitch, and pitch increase therefore continues until the pitch indicator carriage 340 closes the limit switch 344 which energizes the coil 322 and opens the electromagnetically controlled valve 316, which completes a hydraulic circuit for the pump 284 irrespective of the main valve 286, whereby pitch increase stops at the predetermined maximum pitch angle for which the limit switch 344 has been set, which, for example, may preferably be about fifty-five degrees above zero pitch, and automatic pitch change will not thereafter be resumed until the engine does lose sufficient speed to cause the governor 288 to move the valve stem 292 up to where it restricts the circuit of the upper pump 282 to thereby again decrease the pitch.

As in previous cases, the feathering and the braking pitches are effected by manual control. Switch 358 is securely closed on to the contacts 360 and 362, while switch 350 may be brought into engagement with either of the contacts 354 or 356 for feathering or for braking respectively.

Engagement of the switch 350 with the contact 354 energizes the coil 332 of the valve 326 whereby the valve 326 closes and blocks the discharge side of the pump 284 which, when combined with gearing as shown in Fig. 1, increases the propeller pitch.

Where feathering has become advisable the operator holds the switch 350 on the contact member 354 until the pitch indicator carriage 340 opens the limit switch 348, whereupon the propeller will remain locked at the pitch which it had reached when the limit switch was opened, which may preferably be about plus eighty-seven degrees. Engagement of the switch 350 with the other contact member 356 is thereafter required to move away from the feathering position toward decreased pitch.

Engagement of the switch 350 with the contact member 356 energizes the coil 330 of the valve 324 whereby the valve closes and blocks the discharge side of the pump 282 which, when combined with gearing such as is shown in Fig. 1, decreases the propeller pitch.

When braking by means of the propeller is to be accomplished, the operator holds the switch 350 on the contact member 356 until the pitch indicator carriage 340 opens the limit switch 346, whereupon the propeller will remain locked at the pitch which it had reached when the limit switch was opened, which may preferably be about minus twenty-five degrees. Engagement of the switch 350 with the other contact member 354 is thereafter required to move away from the braking position to zero and then toward increased pitch.

Figure 13:
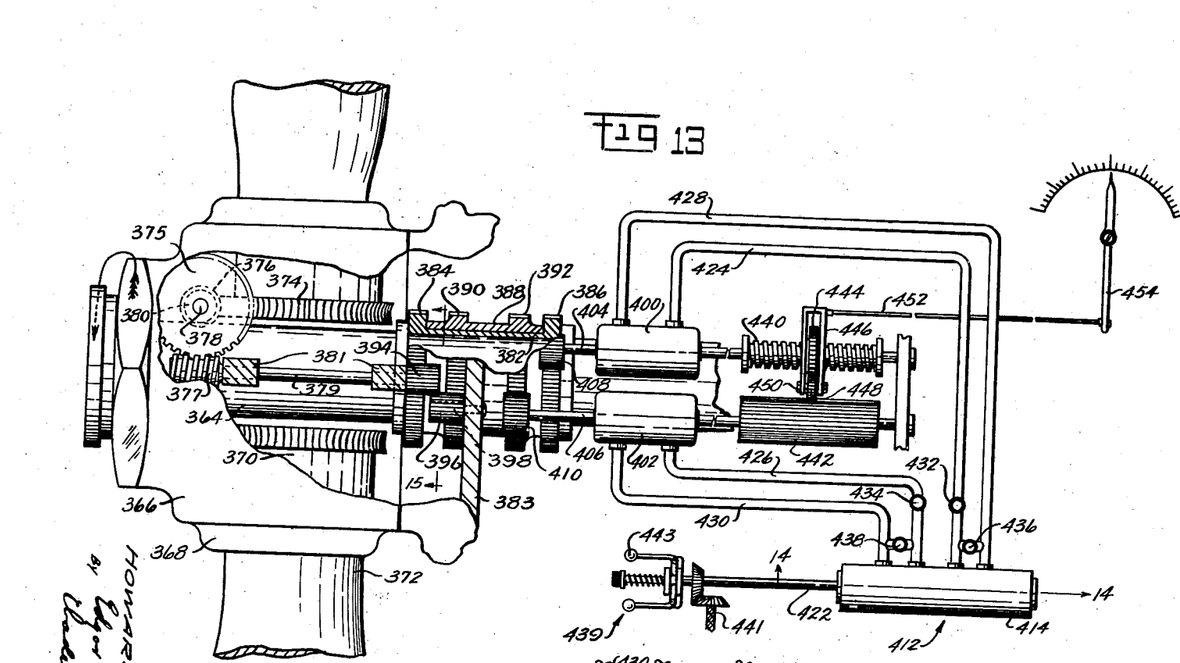
Fig. 13 is an assembled view of a mechanism in which a number of the features shown in Figs. 1 to 12 are combined.
Figure 14:
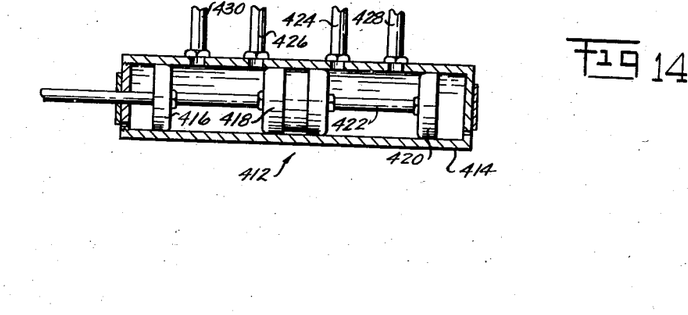
Fig. 14 is a longitudinal section, taken at 14—14 of Fig. 13 through the control valve.

Figs. 13 through 15 show a device in which the several features of the hereinbefore described invention are combined in a single structure. A propeller shaft 364 is drivably connected to a propeller hub 366. Bosses 368 in the hub provide rotative bearing for the shanks 370 of the blades 372 whereby the blades are rotatable about their respective axes in the bosses.

Worm wheels 374 secured to the inner ends of the shanks 370 are engaged by worms 376, the shafts 378 of which also have rotative bearing in bosses 380 in the hub 366. A second worm wheel 375 is affixed to the end of the shaft 378. A second worm 377 is fast on the end of a shaft 379 which has rotative bearing in bosses 381 of the hub 366.

Freely rotatable on the shaft 364 is a sleeve 382 which has integral therewith or secured thereto two gears 384 and 386, and freely rotatable on the sleeve 382 is a second sleeve 388 which has attached thereto or integral therewith two gears 390 and 392.

Pinions 394 are drivably secured to the rear end of the shafts 379, whereby pinions 394 are held in mesh with the gear 384, while idler pinions 396 are freely rotatable on studs 398 whereby idler pinions 396 are held in mesh with the gear 390. The studs 398 are rigidly secured in a rib 383 of the hub 366.

Pinions 394 and 396 have wider faces than the gears 384 and 390 with which they respectively mesh, the excess width extending into the narrow space between the interfacing gears 384 and 390 where the pinions lap over each other, the lapped over ends being in mesh, one pinion with the other, whereby when any one of the gears 384, 386, 390 or 392 rotates in unison with the shaft 364, that is, at propeller speed, the others must do likewise, but if either of the pairs of gears 384—386 or 390—392 rotates in either direction relative to the propeller rotations, the other pair will rotate oppositely with respect to the propeller rotation. Specifically exemplified, if the pair of gears 384—386 are held non-rotative while the propeller rotates forwardly at 1000 R. P. M., the pair of gears 390—392 will rotate forwardly at 2000 R. P. M. So also, if the pair of gears 384—386 is retarded to 900 R. P. M., while the propeller rotates at 1000 R. P. M., the pair of gears 390—392 will rotate at 1100 R. P. M., the one pair always gaining that which the other loses and vice versa. The matter of how much the gear 384 gains or loses in turns, with respect to the rotations of the propeller, determines how much the pinions 394, worms 376 and 377, and worm wheels 374 and 375 turn on their respective axes and therefore how much the pitch of the blades 372 is altered.

Since retardation of the gear 386 retards the gear 384 below propeller speed and retardation of the gear 392 causes the gear 384 to gain over propeller speed, propeller pitch may be increased or decreased by respectively retarding gear 386 or 392.

For retarding rotation of gears 386 and 392 one at a time, the fluid pumps 400 and 402 are provided, their shafts 404 and 406 having attached to their ends the pinions 408 and 410 which are meshed respectively with the gears 386 and 392, whereby retardation of the pumps retards the gears.

Pumps 400 and 402, the hydraulic circuits through which they pump, and the valves which control the circuits are substantially like those discussed with reference to Figs. 1 and 2. The main control valve 412 comprises a casing 414 which slidably receives a series of pistons 416, 418 and 420 spaced apart on a rod 422. The discharge ports of the pumps are connected by conduits 424 and 426 and the suction ports by conduits 428 and 430 to the valve casing intermediate the pistons as shown in Fig. 14. When the piston 418 is positioned centrally in the casing as shown, fluid circuits are completed from the discharge to the suction side of the pumps through the spaces between the several spaced apart pistons.

As long as fluid circulates thus freely no change in propeller pitch will take place. However, when the pistons move one way or the other in the casing 414 one or the other of the discharge passages will be restricted and propeller pitch adjustment will take place. Thus if the piston 418 is moved to restrict the opening 424, the pump 400 will slacken its speed, the pinion 408 will retard the speed of the gear 386 which will retard the gear 384, whereby the pinion 394, worm 377, worm wheel 375, worm 376, and worm wheel 374 will rotate on their axes in the same direction as the propeller, and the propeller pitch will thereby be increased. Obviously, shifting the piston 418 in the opposite direction will restrict the discharge conduit 426, slacken the speed of the pump 402 and retard the gears 392 and 390, whereby the pinion 396 will roll around the gear 390, turning on its own axis in the same direction as the propeller is rotating, which will impart reverse rotation to the pinion 394 and worm 377, and the propeller pitch will thereby be decreased. The sensitivity control valves 432 and 434 and the relief valves 436 and 438 are, in construction and in operation, the same as described relative to Fig. 2.

A flyball governor 439 driven off of the engine through gears 441 is so constructed that an increase in speed which moves the governor weights 443 away from the governor axis thereby moves the piston rod 422 to close the discharge opening 424 of the pump 400 which, as before explained, increases the propeller pitch and brings the engine speed back to the selected normal. Conversely, a decrease in engine speed which allows the weights to move toward the governor axis will decrease the propeller pitch to allow the engine to regain its normal speed.

The pitch indicating mechanism shown in Fig. 13 is the same in principle as that shown and described relative to Fig. 7, but is operated off of the two pump shafts 404 and 406 which are extended to carry the pitch indicator parts, the extension of shaft 404 having secured thereto the screw 440, whereas the extension of the shaft 406 has attached the wide faced pinion 442. A narrow faced pinion 444 is internally threaded to fit the thread of the screw 440 and a pitch indicator carriage 446 straddles the narrow faced pinion so as to follow it when it moves along the screw.

The ratio of gear 386 to pinion 408 is the same as the ratio of gear 392 to pinion 410, and gears 386 and 392 rotate at the same speed and in the same direction, therefore the shafts 404 and 406 rotate at the same speed and in the same direction. It is therefore required that the wide faced pinion 442 and the narrow faced pinion 444 be of the same diameter and be connected by an idler pinion 448 which may be carried on a stud 450 supported in the limbs of the carriage 446. A "Bowden" wire 452, or similar remote control means may connect the carriage 446 to a conveniently located pitch indicator needle 454.

In the device shown in Figs. 13 to 15 no manual means of operation for feathering or for braking is indicated, but if the electromagnetically controlled valves 314, 316, 324 and 326 and the relief valves 333 and 335 are added to the fluid circuits of Fig. 13 as they are in Fig. 9, and the limit switches 342, 344, 346 and 348 are arranged so as to be operated by the pitch indicator carriage 446 as they are by the pitch indicator carriage 340 of Fig. 12, the further addition of the manual switches 350 and 358 and the wiring of Fig. 12 will provide a satisfactory arrangement for this purpose.

Having described an embodiment of my invention with several variants and modifications, I claim:

1. An adjustable pitch screw propeller comprising a rotatable propeller hub, a propeller blade having its root rotatable in said hub about the axis of the blade, a gear secured to the root of said blade to rotate said blade about the blade axis, a pinion having rotative bearing in said hub, speed reducing gearing connecting said pinion and said gear, a spring pressed detent ball adjacent said pinion, said pinion having a circular row of pockets into which said ball is spring pressed, an internal gear coaxial with the hub having rotative bearing in said hub and meshing with said pinion, an external gear within said internal gear coaxial with the hub having rotative bearing in said hub and meshing with said pinion, a nonrotative member, a second pinion in mesh with said internal gear only, a third pinion in mesh with said external gear only, shafts for said second and third pinions, journal bearings in said nonrotative member for said second and third pinion shafts, and a brake for each of said second and third pinion shafts carried by said nonrotative member.

2. An adjustable pitch screw propeller comprising a rotatable propeller hub, a propeller blade having its root rotatable in said hub about the axis of the blade, a worm wheel secured to the root of said blade to rotate said blade, a worm in mesh with said wheel, a worm shaft for said worm having its axis transverse to the axis of the hub, a journal bearing for said worm shaft in said hub, a second worm wheel on said worm shaft, a second worm in mesh with said second wheel, a second worm shaft, a pinion on said second worm shaft, an internal gear coaxial with the hub having rotative bearing in said hub and meshing with said pinion, an external gear within said internal gear coaxial with the hub having rotative bearing in said hub and meshing with said pinion, drag means associated with said second worm shaft to prevent too free rotation thereof, a nonrotative member, a second pinion in mesh with said internal gear only, a third pinion in mesh with said external gear only, shafts for said second and third pinions, journal bearings in said nonrotative member for said second and third pinion shafts, and an electric brake for each said pinion shaft carried by said nonrotative member.

3. An adjustable pitch screw propeller comprising a propeller hub, a propeller blade having its root rotatable in said hub about an axis substantially transverse to the hub axis, a speed-reducing gear set consisting of a driven gear secured to said root to rotate said blade, a driving gear, and gearing intermediate said driven and driving gears, a driving shaft with its axis parallel to the hub axis, a journal bearing in said hub for said shaft, said driving gear being drivably secured to one end of said shaft, an elongated pinion drivably secured to the other end of said shaft, a second elongated pinion of substantially the same diameter and face as the first said pinion in mesh with the first said pinion but axially shifted so that part only of the faces of the pinions overlap and mesh one with the other, means to rotatably support said second elongated pinion in said hub, with its axis parallel to the shaft axis and at substantially equal distance from the hub axis, a third gear coaxial with the hub but shifted axially with respect to the first elongated pinion so as to be in mesh with that portion of the first said pinion which does not overlap the second said pinion, a fourth gear of substantially the same diameter as the third gear coaxial with the hub but shifted axially with respect to the second elongated pinion so as to be in mesh with that portion of the second said pinion which does not overlap the first said pinion, a nonrotatable member, and braking means carried on said nonrotatable member for retarding the speed of the two gears one at a time to a speed below the speed of the hub.

4. An adjustable pitch aircraft propeller comprising a propeller hub, a propeller blade having its root rotatable in said hub about the blade axis, gearing including a first reaction gear retardable for rotating said blade to increase its pitch, gearing including a second reaction gear retardable for rotating said blade to decrease its pitch, and retarding means for each reaction gear comprising a pump rotatable by said reaction gear, means containing an external circuit for said pump, a main valve for restricting the two circuits one at a time, a relief valve for each circuit for limiting the restrictive action of the main valve, and means in each circuit adjusted to restrict the circuit to provide a restraining torque on its reaction gear equal to the torque necessary to break the static friction incident to changing the propeller pitch.

5. An adjustable pitch aircraft propeller comprising a propeller hub, a propeller blade having its root rotatable in said hub about the blade axis, gearing including a reaction gear, said reaction gear being retardable for rotating the blade to change the pitch, and retarding means comprising a pump rotatable by said reaction gear, means containing an external circuit for said pump, a main valve to restrict flow in said external circuit, a bypass in said circuit, a relief valve in said bypass, and a manually adjustable sensitivity-control valve in said circuit.

6. An adjustable pitch aircraft propeller comprising a propeller hub, a propeller blade having its root rotatable in said hub about the blade axis, gearing for rotating said blade, said gearing including a reaction gear, said reaction gear being retardable for rotating the gearing to change the pitch, and a friction brake for retarding the reaction gear, said friction brake comprising a brake drum connected to the gear to be retarded, a rotatable casing surrounding said drum, means to rotate said casing oppositely to the rotation of said drum, a stationary housing for rotatably supporting said casing, the inner peripheral surface of said casing being provided with an annular rib intermediate its end walls, a plurality of brake shoes within said casing fitted to said drum, means to compel unitary rotation of said shoes with said casing, a nonrotatable member supported on said housing and extending coaxially into said casing, a second nonrotatable member supported on the first nonrotatable member and arranged for transverse movement on said second member in said casing, a pair of scoops carried on said second nonrotatable member for transverse movement in said casing, each scoop having a forward and a rearward end with the forward end farthest from the axis of the casing, the forward end of one scoop and the rearward end of the other being adjacent and on the same side of the annular rib, and manual means outside said casing, extending into said casing for moving said second nonrotatable member transversely.

7. An adjustable pitch aircraft propeller comprising a propeller hub, a propeller blade having its root rotatable in said hub about the blade axis, a gear train including two reaction gears both coaxial with the propeller hub, one of which is retardable for operating the gear train in one direction for increasing the propeller pitch, and the other retardable for operating the gear train in the other direction for decreasing the propeller pitch, said reaction gears both being normally rotatable at the same speed as the propeller hub, when no pitch change is being effected, means to retard said reaction gears one at a time, an elongated pinion rotated by one of said reaction gears, a screw rotated by the other reaction gear, an internally threaded pinion, having the same number of teeth as said elongated pinion, on said screw and in mesh with said elongated pinion, and an indicating means movable by axial movement of said internally threaded pinion on said screw.

8. An adjustable pitch aircraft propeller comprising a propeller hub, a propeller blade having its root rotatable in said hub about the blade axis, a gear train including a pinion rotatable in one or the other direction to increase or decrease the propeller pitch, an internal gear and a concentric external gear, both in mesh with said pinion both coaxial with the propeller hub and both rotatable at propeller speed when no pitch change is being effected, means to retard said internal and said external gears one at a time, a second pinion in mesh with said internal gear, a third pinion in mesh with said external gear, an elongated pinion drivably secured to the second said pinion, a screw drivably secured to the third said pinion, an internally threaded pinion fitted over said screw, and indicating means movable by axial movement of said internally threaded pinion on said screw, the ratio of the internal gear to the second said pinion divided by the ratio of the external gear to the third said pinion being the ratio of the internally threaded pinion to the elongated pinions.

9. An adjustable pitch aircraft propeller comprising a propeller hub, a propeller blade having its root rotatable in said hub about the blade axis, a gear mechanism for rotating said blade including a reaction gear retardable for rotating said blade in one direction and a reaction gear retardable for rotating said blade in the other direction, both reaction gears being concentric with the propeller hub and both rotating at the same speed and in the same direction when no pitch change is being effected, a screw drivably connected to be rotated by one of the reaction gears, a wide-faced pinion drivably connected to be rotated by the other reaction gear, a relatively narrow-faced pinion internally threaded to fit over said screw, a carriage movable axially by axial movement of said pinion on said screw, an idler pinion rotatably connecting said wide and narrow-faced pinions, means rotatably supporting said idler on said carriage, and pitch-indicating means operable by movement of said carriage.

10. An electrically governed hydraulic control means for a variable pitch propeller which includes valve means resiliently biased to a neutral position to hold the pitch in status quo, a reversible electric motor, linkage connecting said valve and motor whereby operation of the motor in one or the other direction moves the valve in one or the other direction from neutral to increase or decrease the pitch, electrically connectible power transmitting means deenergizable coincidentally with said motor for disconnecting the linkage when current is disconnected from the motor, whereby said valve may return to its neutral position without operation of the motor, and an engine-driven speed-responsive electric switch for directing current to the motor for one or the other direction of operation when the engine is overspeed or underspeed.

11. An electrically governed hydraulic control means for a variable pitch propeller which includes a slidable valve, spring-biased to a neutral position to hold the pitch in status quo, a reversible electric motor, gearing connecting said valve and motor whereby rotation of the motor in one or the other direction moves the valve in one or the other direction from neutral to increase or decrease the propeller pitch, an electrically controlled clutch in the gearing having its winding in series with the motor winding, whereby the motor and valve are connected only when current passes through the motor, and the valve may return to its neutral position without rotating the motor, when current is shut off from the motor an electric switch operable to two positions for rotating the motor in one or the other direction, and a centrifugal device for operating said switch.

12. An electrically governed hydraulic control means for a variable pitch propeller which includes a plunger valve, spring-biased to a neutral position to hold the pitch in status quo, a reversible electric motor, gearing connecting said valve and motor whereby rotation of the motor in one or the other direction moves the valve in one or the other direction away from neutral to increase or decrease the propeller pitch, an electrically controlled, spring-opened clutch in the gearing having its winding in series with the motor winding, two electric circuits, an electric speed-responsive switch for directing current by either of the two circuits through the motor to change the direction of rotation of the motor, a pitch-change-sensitive device movable in one or the other direction as the pitch increases or decreases, and limit switches, one in each said circuit positioned in the path of the pitch-change-sensitive device so as to be opened thereby at a preselected pitch increase or decrease.

13. Control means for a variable pitch propeller having a positive and a negative pitch range, which includes an electric motor with two internal circuits, one for rotating the motor in one direction to increase the propeller pitch and the other for rotating the motor in the other direction to decrease the propeller pitch, a current source, an automatic speed-controlled switch having an automatic pitch-increase and an automatic pitch-decrease contact, and an automatic current-receiving contact which is adapted for engagement one at a time with the automatic pitch-increase and the automatic pitch-decrease contacts by a rise or a drop in speed, a manual switch comprising a manual current supply contact, a manual pitch-increase contact, and a manual pitch-decrease contact with means to selectively connect the current source to the manual current supply contact, the manual pitch-increase contact or the manual pitch-decrease contact, the manual current supply contact and the automatic current receiving contact being in electrical communication, four current-conducting means, the first and second for joining the automatic and the manual pitch-increase contacts to the internal circuit for pitch increase and the third and fourth for joining the automatic and the manual pitch-decrease contacts to the internal circuit for pitch decrease, a pitch-change-sensitive device movable in one or the other direction as the pitch increases or decreases, pitch-change-limiting switches, one in each said current-conducting means positioned in the path of the pitch-change-sensitive device so as to be opened thereby at a preselected pitch increase or decrease, and a reversing switch operative by movement of said pitch-change-sensitive device into the negative pitch range to connect the automatic pitch increase contact to the internal circuit for pitch decrease, and the automatic pitch decrease contact to the internal circuit for pitch increase.

14. Control means for a variable pitch propeller having a positive and a negative pitch range, which includes an electric motor with two internal circuits, one for rotating the motor in one direction to increase the propeller pitch and the other for rotating the motor in the other direction to decrease the propeller pitch, a current source, an automatic speed-controlled switch having an automatic pitch-increase and an automatic pitch-decrease contact, and an automatic current-receiving contact which is adapted for engagement one at a time with the automatic pitch-increase and the automatic pitch-decrease contacts by a rise or a drop in speed, a manual switch comprising a manual current supply contact, a manual pitch-increase contact, and a manual pitch-decrease contact with means to selectively connect the current source to the manual current supply contact, the manual pitch-increase contact or the manual pitch-decrease contact, the manual current supply contact and the automatic current receiving contact being in electrical communication, four current-conducting means, the first and second for joining the automatic and the manual pitch-increase contacts to the internal circuit for pitch increase and the third and fourth for joining the automatic and the manual pitch-decrease contacts to the internal circuit for pitch decrease, a pitch-change-sensitive device movable in one or the other direction as the pitch increases or decreases, and a reversing switch operative by movement of said pitch-change-sensitive device into the negative pitch range to connect the automatic pitch increase contact to the internal circuit for pitch decrease, and the automatic pitch decrease contact to the internal circuit for pitch increase.

15. Control means for a variable pitch propeller having a positive and a negative pitch range, which includes an electric motor with two internal circuits, one for rotating the motor in one direction to increase the propeller pitch and the other for rotating the motor in the other direction to decrease the propeller pitch, a current source, an automatic speed-controlled switch having an automatic pitch-increase and an automatic pitch-decrease contact, and an automatic current receiving contact which is adapted for engagement one at a time with the automatic pitch-increase and the automatic pitch-decrease contact by a rise or a drop in speed, means to connect the current source to the current receiving contact, two current-carrying conductors, one joining the automatic pitch-increase contact to the internal circuit for pitch increase and the other joining the automatic pitch-decrease contact to the internal circuit for pitch decrease, a pitch-change-sensitive device movable in one or the other direction as the pitch increases or decreases, a reversing switch operative by movement of said pitch-change-sensitive device into the negative pitch range to connect the automatic pitch increase contact to the internal circuit for pitch decrease, and the automatic pitch decrease contact to the internal circuit for pitch increase.

16. Control means for a variable pitch propeller wherein gearing for effecting pitch change contains two reaction gears retardable, one at a time, for increasing or decreasing the pitch, said control mechanism comprising two fluid pumps, one drivably connected to each reaction gear, means containing an external fluid circuit for each pump, a speed-responsive device, a valve operatively connected to said speed-responsive device and adapted, at a selected normal speed, to permit free flow through both said circuits but above or below said speed to restrict flow in one or the other circuit to retard rotation of said pumps one at a time, a bypass in each said fluid circuit, a relief valve in each said bypass, a second bypass in each said fluid circuit, a second valve in each said second bypass, resilient means for biasing the said second valves to closed position, electromagnetic means to open said second valves, a third valve in each circuit, resilient means for biasing said third valves to open position, electromagnetic means for closing said third valves, an electric current source, and switch means for selectively energizing the electromagnetic means of one or the other of the said third valves.

17. Control mechanism for a variable pitch propeller wherein gearing for effecting pitch change contains two reaction gears, retardable, one at a time, for increasing or decreasing the pitch, said control mechanism comprising two fluid pumps, one drivably connected to each reaction gear, means containing an external fluid circuit for each pump, a speed-responsive device, a valve operatively connected to said speed-responsive device and adapted, at a selected normal speed, to permit free flow through both said fluid circuits but above or below said speed to restrict flow in one or the other fluid circuit to retard rotation of said pumps one at a time, a bypass in each said fluid circuit, a relief valve in each said bypass, a second bypass in each said fluid circuit, a second valve in each said second bypass, resilient means for biasing said second valves to closed position, electromagnetic means to open said second valves, a third valve in each fluid circuit, resilient means for biasing said third valves to open position, electromagnetic means for closing said third valves, a pitch-change-sensitive device, an electric current source, manual switch means for selectively energizing the electromagnetic means of one or the other of the said third valves, and automatic switch means operable by said pitch-change-sensitive device for energizing the electromagnetic means of one or the other of the said second valves or de-energizing the electromagnetic means of one or the other of said third valves.

HOWARD M. McCOY.